Dec. 11, 1923.
R. A. DOBBELAAR
AUTOMOBILE LOCK
Filed March 8, 1923   2 Sheets-Sheet 1
1,477,165
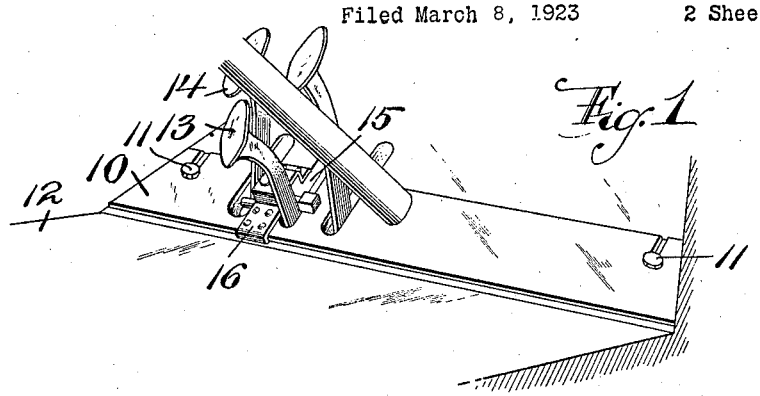
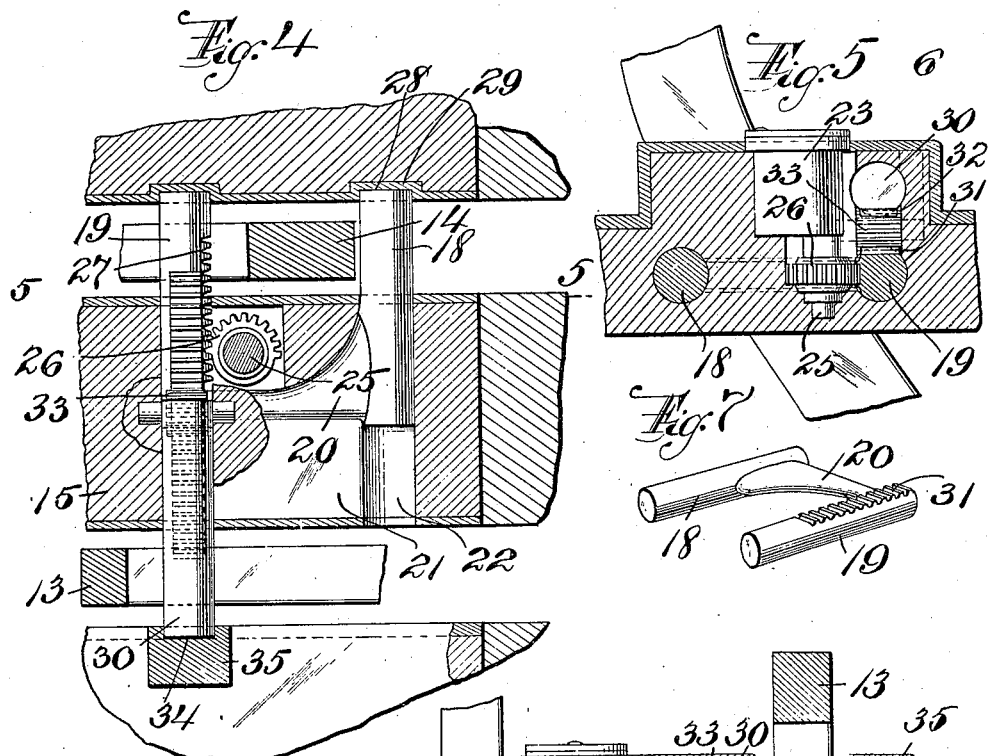
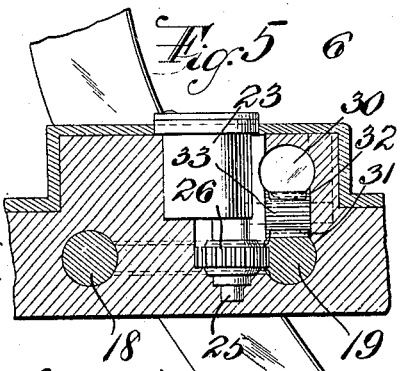
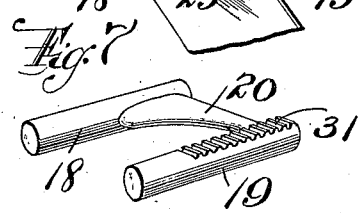
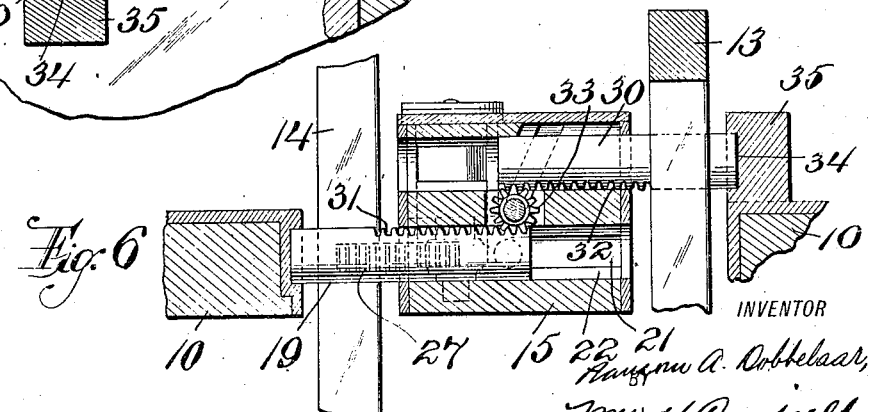
INVENTOR

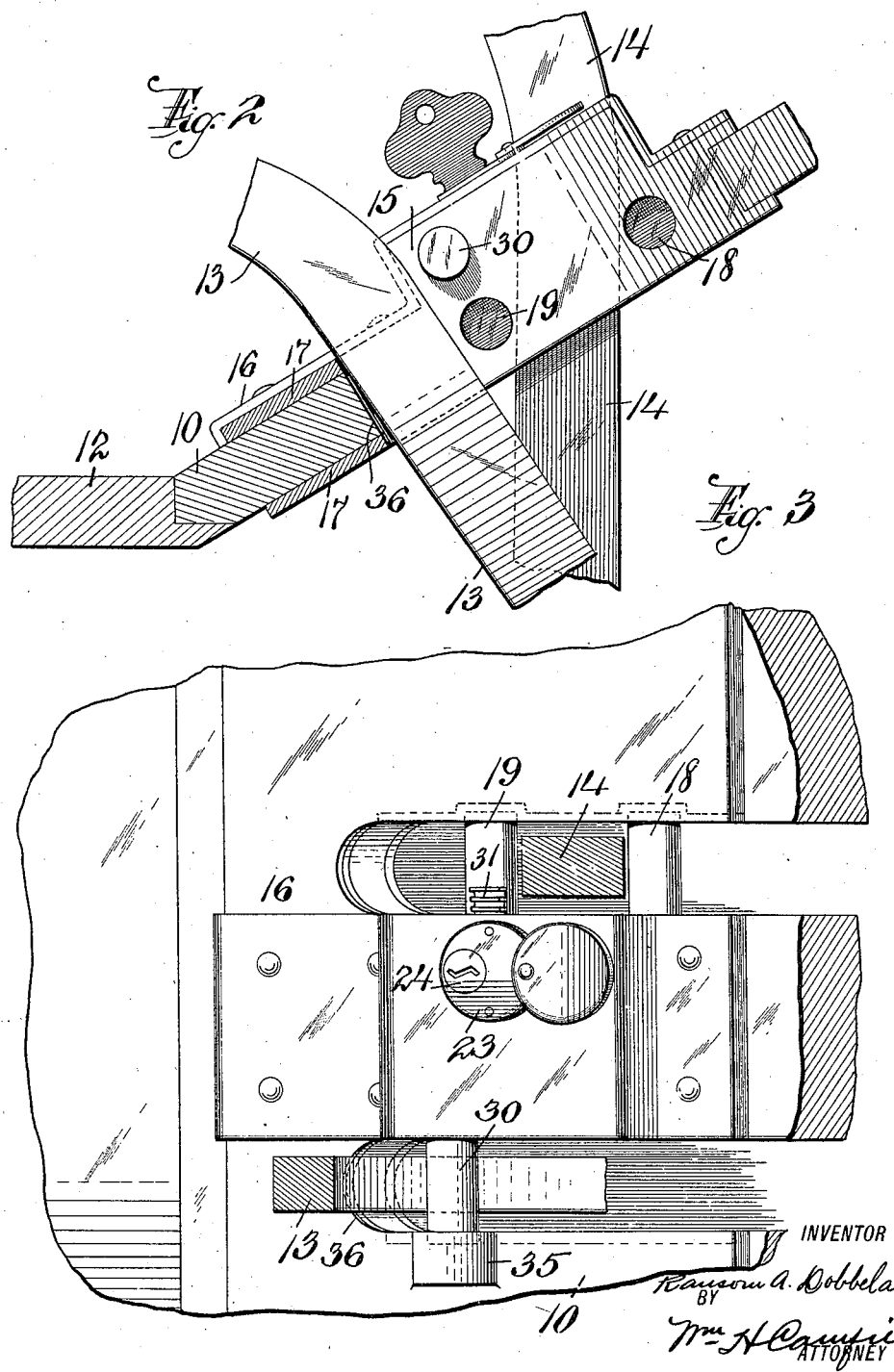

Patented Dec. 11, 1923.

1,477,165

UNITED STATES PATENT OFFICE.

RANSOM A. DOBBELAAR, OF NEWARK, NEW JERSEY.

AUTOMOBILE LOCK.

Application filed March 8, 1923. Serial No. 623,591.

*To all whom it may concern:*

Be it known that I, RANSOM A. DOBBELAAR, a citizen of the United States, and a resident of Newark, county of Essex, and State of New Jersey, have invented certain new and useful Improvements in Automobile Locks, of which the following is a specification.

This invention relates to an improved lock for automobiles, and is designed to securely lock both the clutch pedal and the reverse pedal as they are arranged on Ford cars, but it will be understood that the parts may be adjusted and disposed to hold a pair of levers that work in parallel relation on any make of car, and also to lock levers with different functions, such as clutch pedal and reverse pedal, or gear shift lever and clutch pedal, in fact being adapted for use in any situation where such parallel operating levers are to be locked.

The invention is designed to provide a lock which has bolts that are adapted to be projected from the lock casing into the path of levers that work in slots on each side of the casing or its support. The bolts are arranged to work in unison and to be actuated from the key-operated lock in the casing, the parts being thus contained in a casing so that they are not apt to be clogged by dirt, thus being operative at all times.

The invention illustrated in the accompanying drawings, in which Figure 1 is a perspective view, showing the floor board and the levers of my improved lock in elevation. Figure 2 is a side view of the lock with the floor board in section. Figure 3 is a top view of the lock. Figure 4 is a top view of the lock, broken away at parts to show the bolts. Figure 5 is a cross-section taken on line 5—5 in Figure 4. Figure 6 is a section taken on line 6—6 in Figure 5, and Figure 7 is a perspective view of one of the bolts.

I prefer to fasten the lock on a floor board 10 which is in itself secured to the chassis of the automobile by bolts 11, the rear end of this floor board being fitted under the floor board 12 of the automobile, so that the board itself can not be raised and moved, thus holding the lock in fixed position. In the drawings I show the clutch arrangement of a Ford car, 13 indicating the reverse lever and 14 indicating the clutch lever. These two levers operate through slots in the floor board 10, and the lock casing 15 is placed between the slots, forming preferably one wall of each slot, the lock casing being held in place by any suitable means, such as the strap 16 passing thereover, this strap being riveted through the metal plates 17 and through the floor board 10 to hold the whole device compactly together. The plates 17 are placed at the end of the slots for taking up the wear induced by the contact with the levers at the ends of the slots, preventing splintering of the wood.

The casing is provided with bolts which are projected from the opposite sides of the casing and thus passed across the slots or withdrawn from the slots when the levers are to be released, one of the bolts being a double bolt, being substantially U-shaped, the ends 18 and 19 of this double bolt being connected by a bar 20, the casing being cut away, as at 21, to permit this bar to slide, the casing also having the cut away channels 22 for the double bolt, the bars of which can thus travel back and forth, according to their operation, which operation is usually accomplished by key-operated means, and I show in this connection the lock 23 secured in the lock casing, which lock is adapted to be key-operated, the rotative part 24 of the lock having at the bottom a projecting stud 25 on which is a pinion 26, usually a segmental pinion, this segmental pinion being disposed so that its teeth are in mesh with the teeth 27 on one of the bars of the double bolt.

It will thus be evident that when the segmental pinion 26 is rotated in one direction, the double bolt is withdrawn from across the slot, and when the key-operated means is operated in the other direction, the double bolt is projected across the slot, and when so projected is preferably made secure by being fitted into the depressions 28 in the plate 29.

On the opposite side of the lock casing is a bolt, this bolt being preferably a single bolt and being shown at 30, this bolt being withdrawn or projected at the same time the double bolt is withdrawn or projected, by reason of the bolt 30 being placed opposite one of the bars, such as the bar 19, of the double bolt, the opposed faces of these two bolts 19 and 30 being provided with teeth, the teeth being shown at 31 on the bolt 19 and at 32 on the bolt 30, and are spaced far enough apart to permit the insertion of a pinion 33, this pinion being in mesh with the teeth on both of the above mentioned bolts, so that when the bolt 19 is operated the bolt 30 is operated in the opposite direction, and since they pass out of the opposite sides of the casing they are withdrawn or projected simultaneously, according to how the lock 23 is operated.

The bar 30, when it is projected, is preferably held against being broken by undue strain by having its end fitted into the recess 34 of the stop 35 on the rear of the slot opposite that edge on which the lock casing is situated.

This form of lock locks the reverse lever between the bolt 30 and the end 36 of the slot in which the bolt operates, the clutch lever in the other slot being at a different angle when in normal position and thus being held between the two bars 18 and 19 of the double bolt. This lock takes up but little room, is inconspicuous, is arranged so as to be easily accessible, and in this compact accessible situation locks, by one movement of the lock, two levers of the automobile, thus doubly insuring the car against theft.

I claim:

1. An automobile lock comprising a support having slots therein, a lock casing between the slots, a lock in the casing, and bolts actuated by the lock to be projected across or withdrawn from the slots, the bolt on one side having spaced projecting parts to form a double bolt, and the one on the other side being single.

2. An automobile lock comprising a support having parallel slots, a lock casing between the slots, bolts slidable in the casing and adapted to be projected from opposite sides of the casing across the slots, a pinion between the bolts to cause their simultaneous operation, a lock in the casing, and a segmental pinion operated from the lock and in mesh with one of the bolts.

3. An automobile lock comprising a support having parallel slots, a lock casing between the slots, bolts slidable in the casing and adapted to be projected from opposite sides of the casing across the slots, a pinion between the bolts to cause their simultaneous operation, a lock in the casing, and a segmental pinion operated from the lock and in mesh with one of the bolts, one of said bolts being U-shaped with its free end forming a double bolt.

In testimony that I claim the foregoing, I have hereto set my hand, this 24th day of February, 1923.

RANSOM A. DOBBELAAR.